United States Patent [19]

Coady et al.

[11] Patent Number: 5,219,896
[45] Date of Patent: Jun. 15, 1993

[54] PRIMARY COATINGS FOR OPTICAL GLASS FIBERS INCLUDING POLY(CARBONATE-URETHANE) ACRYLATES

[75] Inventors: Clive J. Coady, Hanover Park; Erwin S. Poklacki, Arlington Heights; John M. Zimmerman, Crystal Lake; Timothy E. Bishop, Algonquin; John L. Derer, Arlington Heights, all of Ill.

[73] Assignee: Stamicarbon, B.V., Netherlands

[21] Appl. No.: 859,344

[22] Filed: Mar. 27, 1992

Related U.S. Application Data

[63] Continuation-in-part of Ser. No. 730,589, Jul. 15, 1991, abandoned, which is a continuation-in-part of Ser. No. 403,596, Sep. 6, 1989, abandoned.

[51] Int. Cl.$^5$ .................. C08F 2/48; C08F 283/04; C08G 18/44; C08G 18/48
[52] U.S. Cl. ................ 522/96; 522/97; 522/90; 525/453; 525/454; 525/920; 525/455
[58] Field of Search ............. 522/96, 97, 90; 525/455, 454, 453, 920

[56] References Cited

U.S. PATENT DOCUMENTS

| | | | |
|---|---|---|---|
| 4,255,243 | 3/1981 | Coqueugniot et al. | 525/440 |
| 4,264,752 | 4/1981 | Watson, Jr. | 525/467 |
| 4,608,400 | 8/1986 | Yokoshima et al. | 522/96 |
| 4,608,409 | 8/1986 | Coady et al. | 524/199 |
| 4,624,994 | 11/1986 | Ansel | 525/440 |
| 4,690,501 | 9/1987 | Zimmerman et al. | 522/96 |
| 4,690,502 | 9/1987 | Zimmerman et al. | 522/96 |
| 4,741,958 | 5/1988 | Bishop | 522/103 |
| 4,798,852 | 1/1989 | Zimmerman et al. | 522/96 |
| 4,932,750 | 6/1990 | Ansel et al. | 522/96 |

*Primary Examiner*—Marion E. McCamish
*Assistant Examiner*—Susan Berman
*Attorney, Agent, or Firm*—Dressler, Goldsmith, Shore, Sutker, and Milnamow, Ltd.

[57] ABSTRACT

Photocurable liquid coating compositions adapted to provide primary coatings for optical glass fibers are disclosed. These compositions comprise polycarbonate-based acrylate-terminated polyurethane, an acrylate of an unsubstituted or $C_1$–$C_{10}$ alkyl substituted phenol that is alkoxylated with a $C_2$–$C_4$ alkylene oxide and at least one alkylacrylate having a $T_g$ below about −45° C. Films produced from these ultraviolet light curable compositions are flexible and possess good water resistance and good wet adhesion.

22 Claims, No Drawings

PRIMARY COATINGS FOR OPTICAL GLASS FIBERS INCLUDING POLY(CARBONATE-URETHANE) ACRYLATES

CROSS REFERENCE TO RELATED APPLICATIONS

This application is a continuation-in-part of U.S. Ser. No. 07/730,589, filed Jul. 15, 1991 and now abandoned, which is a continuation-in-part of U.S. Ser. No. 07/403,596, filed Sep. 6, 1989 and now abandoned.

TECHNICAL FIELD

This invention relates to primary coatings for optical glass fibers that are characterized by greater cure speed, enhanced cured film adhesion and stability, reduced water absorption and superior low temperature performance.

BACKGROUND OF THE INVENTION

Optical glass fibers are frequently coated with two superposed photocured coatings. The coating which contacts the glass is a relatively soft, primary coating. The outer, exposed coating is a much harder secondary coating that provides desired resistance to handling forces, such as those encountered when the fiber is cabled.

The coating of optical glass fibers with photocured coating compositions, usually using ultraviolet light, is well known today. Photocuring compositions are selected because of their rapid cure speed. Faster cure speed is generally desirable to increase the production of optical glass fibers.

Coatings produced from conventional compositions including (meth)acrylate-terminated polyurethanes are much too hard to be utilized as primary coatings and exhibit poor adhesion and resistance to microbending especially at low service temperatures. When a polyether acrylate monomer having a low glass transition temperature ($T_g$) is added to these compositions in an amount sufficient to provide adequate flexibility, the water resistance and adhesion of the coating are usually reduced which is undesirable.

It is also desirable to further increase the cure speed of the photocuring composition while retaining the capacity of the cured primary coating to adhere to the glass fiber surface and to resist water absorption.

SUMMARY OF THE INVENTION

The present invention provides compositions suitable as a primary optical glass fiber coating that comprise an acrylate-terminated polyurethane, an acrylate of an alkoxylated phenol and an acrylate having a low $T_g$. The coatings produced from these compositions exhibit good adhesion, flexibility, water resistance and low temperature microbending resistance.

A photocurable liquid coating composition adapted to provide a primary coating for an optical glass fiber is disclosed. The coating composition comprises: (1) about 30 to about 80 weight percent, based on the total weight of the coating composition, of an acrylate-terminated polyurethane (the "acrylated polyurethane") having a number average molecular weight of about 2,500 to about 8,000 daltons, said acrylated urethane being the reaction product of a prepolymer having a number average molecular weight of about 700 to about 2,000 daltons where the prepolymer is selected from the group consisting of polycarbonates and mixtures of polycarbonates and polyethers having an average of at least two groups that are reactive with an isocyanate group, a diisocyanate and a hydroxy acrylate; (2) about 20 to about 60 weight percent of an acrylate of an unsubstituted or $C_7$–$C_1$ alkyl substituted phenol that is alkoxylated with a $C_2$–$C_4$ alkylene oxide and contains about 1 to about 5 moles of the oxide per mole of phenol; and (3) about 5 to about 30 weight percent of at least one alkylacrylate having a glass transition temperature ($T_g$) below about $-45°$ C.

The composition can further include a monoethylenically unsaturated material having a $T_g$ greater than about $40°$ C. and a strong capacity for hydrogen bonding that is present in an amount in the range of about 1 to about 15 weight percent, based on the total weight of the coating composition.

Conventional photoinitiators are also present to initiate polymerization by ultraviolet light and visible light near the ultraviolet wavelength range.

Coatings produced on optical glass fibers from the present coating composition provide good adhesion and enhanced hydrolytic and thermal stability, reduced water absorption and superior low temperature performance, e.g., improved resistance to microbending, as compared to conventional primary coatings.

As previously discussed, poly ether acrylate monomers can be utilized to introduce flexibility in coatings produced from compositions that include acrylate-terminated polyurethanes. However, these polyether acrylate monomers usually reduce the water resistance and adhesion of the coating. In contradistinction, the present composition utilizes phenol-based acrylate polyethers, identified as component "(2)" of the composition, to introduce softness and flexibility into coatings produced from an acrylated polyurethane while maintaining a desirable degree of water resistance and adhesion. This use of polyethers is unconventional because polyethers typically reduce water resistance and adhesion. The cure speed is also increased and this is desirable.

DETAILED DESCRIPTION OF THE PREFERRED EMBODIMENT

Although this invention is susceptible to embodiments in many different forms, preferred embodiments of the invention are shown. It should be understood, however, that the present disclosure is to be considered as an exemplification of the principles of the invention and is not intended to limit the invention to embodiments illustrated.

A photocurable liquid coating composition adapted to provide a primary coating for an optical glass fiber is disclosed. The coating composition comprises: (1) about 30 to about 80 weight percent, based on the total weight of the coating composition, of an acrylate-terminated polyurethane (acrylated polyurethane) having a number average molecular weight of about 2,500 to about 8,000 daltons and being the reaction product of a prepolymer having a number average molecular weight of about 700 to about 2,000 daltons where the prepolymer is selected from the group consisting of polycarbonates and mixtures of polycarbonates and polyethers having an average of at least two groups that are reactive with an isocyanate group, a diisocyanate and a hydroxy acrylate; (2) about 20 to about 60 weight percent of an acrylate of an unsubstituted or $C_7$–$C_{10}$ alkyl substituted phenol that is alkoxylated with a $C_2$–$C_4$ alkylene oxide and contains about 1 to about 5 moles of the oxide per mole of phenol (acrylate of the alkoxylated phenol); and (3) about 5 to about 30 weight percent of at least one alkylacrylate having a glass transition temperature ($T_g$) below about $-45°$ C.

The term "dalton", in its various grammatical forms, defines a unit of mass that is 1/12th the mass of carbon-12.

The term "acrylate", and various grammatical forms thereof, identifies esters that are the reaction product of acrylic acid with a hydroxy group-containing compound.

The term "alkylacrylate" identifies alkyl substituted acrylates, as for example, hexyl acrylate 2-ethylhexyl acrylate, heptyl acrylate, n-octyl acrylate and isooctyl acrylate.

The term "glass transition temperature, in its various grammatical forms, is defined as the temperature at which the homopolymer of the referred to material changes from a vitreous state to a plastic state.

The acrylate-terminated polyurethane is the reaction product of a prepolymer, an organic diisocyanate and a hydroxy acrylate.

The prepolymer is a carbon chain that can comprise oxygen and/or nitrogen atoms to which the terminal acrylate functionality is added by use of the diisocyanate. Selection of the prepolymer can affect the physical properties of the coatings produced from the oligomer-containing composition.

The prepolymer has on average at least about two prepolymer functional groups that are reactive with the isocyanate group, e.g., a hydroxy, mercapto, amine or similar group. Presently, a preferred prepolymer functional group is the hydroxy group.

The number average molecular weight of the prepolymer is about 700 to about 2,000, preferably about 800 to about 2,000, daltons.

Prepolymers are selected from the group consisting essentially of polycarbonates, and mixtures of polycarbonates and polyethers.

Albeit all of the above-described prepolymers provide improved results when utilized with the acrylate of the alkoxylated phenol, the polycarbonate diols give superior results, especially from the standpoint of hydrolytic and oxidative stability, and thus are preferred.

The polycarbonate diols are conventionally produced by the alcoholysis of diethylcarbonate or diphenylcarbonate with a diol. The diol is an alkylene diol having about 2 to about 12 carbon atoms, e.g., 1,4-butane diol, 1,6-hexane diol, 1,12-dodecane diol and the like, preferably about 4 to about 8 carbon atoms. Mixtures of these diols can also be utilized. The polycarbonate diol can contain ether linkages in the backbone in addition to carbonate groups. Thus, polycarbonate copolymers of alkylene ether diols and the previously described alkylene diols are suitable. Suitable alkylene ether diols include triethylene glycol, tripropylene glycol and the like. These copolymers produce cured coatings that exhibit a lower modulus and also inhibit crystallinity of the liquid coating composition, as compared to polycarbonate diol homopolymers. Admixtures of the polycarbonate diols and polycarbonate copolymer diols can also be utilized.

Suitable polycarbonate diols include Duracarb 122, commercially available from PPG Industries and Permanol KM10-1733, commercially available from Permuthane, Inc., MA. Duracarb 122 is produced by the alcoholysis of diethylcarbonate with hexane diol.

Illustrative polyesters include polybutylene adipate, polycaprolactones and the like.

Illustrative polyethers include poly(propylene oxide), poly(tetramethylene glycol) and the like.

A wide variety of diisocyanates alone or in admixture with one another can be utilized. Representative diisocyanates include isophorone diisocyanate (IPDI), toluene diisocyanate, methylene diphenyl diisocyanate, hexamethylene diisocyanate, cyclohexylene diisocyanate, methylene dicyclohexane diisocyanate, 2,2,4-trimethyl hexamethylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, and the like. A preferred diisocyanate is IPDI.

The hydroxy acrylate can be a monoacrylate or a polyacrylate. Monohydric monoacrylates are presently preferred. The reaction of the isocyanate group with a hydroxy group of the hydroxy acrylate produces a urethane linkage which results in the formation of an acrylate terminated urethane.

Suitable monohydric acrylates are the hydroxy $C_2$-$C_4$ alkyl acrylates and polyacrylates. Illustrative of these acrylates are 2-hydroxyethyl acrylate, 2-hydroxypropyl acrylate, glyceryl diacrylate, and the like. Mixtures of these acrylates are also suitable. The methacrylate counterparts of the above acrylates can also be utilized.

The reaction of the prepolymer, the diisocyanate and the hydroxy acrylate is conventional and is performed in a suitable vessel. The mole ratio of prepolymer diol: diisocyanate: hydroxy acrylate can be in a range of about 1:2:2, respectively, to about 5:6:2, respectively. These reactants together with the low $T_g$ alkyl acrylate diluent monomer are admixed in a vessel with a minor amount of a catalyst for the urethane forming reaction, e.g., about 0.03 to about 0.1, preferably about 0.04, weight percent of dibutyl tin dilaurate. A sparge of dry gas, e.g., dry air, nitrogen, carbon dioxide or the like, is utilized to ensure there is no moisture present which can adversely affect the reaction. The reaction is conducted at a temperature of about 40° to about 80° C. for a time period sufficient to consume substantially all of the hydroxy functionality of the prepolymer diol and the hydroxy acrylate and the free nitrogen-carbon-oxygen groups (NCO) of the diisocyanate.

A preferred method of producing the acrylated polyurethane is to admix the diisocyanate, the hydroxy acrylate, the low $T_g$ alkyl acrylate diluent monomer, and the catalyst in the vessel. The sparge is inserted into the admixture. The reaction is conducted at a temperature at the lower end of the above temperature range, e.g., about 40° to about 60° C., for a time period sufficient to consume substantially all of the hydroxy functionality of the hydroxy acrylate. This time period is typically between about 1 and about 3 hours. After substantially all of the hydroxy functionality is consumed, the prepolymer is introduced into the vessel with continued admixing and the temperature is increased to the upper end of the above temperature range, e.g., about 60° to about 80° C. This temperature is maintained for a time period sufficient to consume substantially all of the free NCO and the prepolymer functional groups. This time period typically is between about 7 and about 10 hours.

The number average molecular weight of the acrylated polyurethane is about 2,500 to about 8,000, preferably about 3,000 to about 7,000 daltons.

The coating composition also includes the acrylate of the unsubstituted or $C_7$-$C_{10}$, preferably $C_8$-$C_9$, alkyl substituted phenol that is alkoxylated with a $C_2$-$C_4$ alkylene oxide so that it contains about 1 to about 5 moles of the oxide per mole of the phenol. Preferably, the acrylate of the alkoxylated phenol contains about 3.5 to about 4 moles of oxide per mole of the phenol.

Suitable alkylene oxides include ethylene oxide, propylene oxide, butylene oxide, and mixtures thereof. Presently, ethylene oxide is preferred.

Representative alkoxylated acrylates include phenoxyethyl acrylate, ethoxylated nonylphenol acrylate and propoxylated nonylphenol acrylate.

Commercially available illustrative acrylates o the alkoxylated phenol include alkoxylated nonyl phenol acrylates such as Aronix M-111, Aronix M-113 and Aronix M-117 from Toa Gosei, Japan.

The coating composition further includes at least one alkylacrylate having a $T_g$ below about $-45°$ C., preferably below about $-60°$ C. The $T_g$ of the alkylacrylate can be as low as about $-90°$ C. This alkylacrylate enhances low temperature microbending resistance.

Suitable alkylacrylates include n-hexylacrylate, 2-ethylhexyl acrylate, heptyl acrylate, n-octyl acrylate, isooctyl acrylate, n-nonyl acrylate and the like. Mixtures of these akylacrylates are also suitable.

The coating composition can further include a monoethylenically unsaturated material having a high $T_g$ and a strong capacity for hydrogen bonding. These monoethylenically unsaturated materials typically have a $T_g$ greater than about 40° C. and are illustrated by N-vinyl monomers such as N-vinyl pyrrolidone, N-vinyl caprolactam, mixtures thereof and the like. The $T_g$ of the monoethylenically unsaturated material can be as high as about 120° C.

The wavelength of the light utilized to cure the coating compositions of the present invention can vary somewhat depending upon the photoinitiator selected. In present practice, the light utilized is usually in the ultraviolet range which extends from about 200 to about 400 nanometers (nm) however, light of a longer wavelength, e.g., light having a wavelength of up to about 600 nm, preferably up to about 520 nm, can be utilized.

The photoinitiators utilized are conventional components of light curable ethylenically unsaturated coatings. Preferred photoinitiators are aryl ketones, e.g., benzophenone, acetophenone, diethoxy acetophenone, benzoin, benzil, anthraquinone, and the like. A commercial photoinitiator is illustrated by Irgacure 184 which is hydroxycyclohexyl phenyl ketone and is available from Ciba-Geigy Corp., Ardsley, NY.

Volatile organic solvents are preferably not utilized in the present coating composition.

The acrylated polyurethane is present in the composition in an amount in the range of about 30 to about 80, preferably about 30 to about 60 weight percent, based on the total weight of the coating composition.

The acrylate of the alkoxylated phenol is present in the coating composition in an amount in the range of about 20 to about 60, preferably about 20 to about 35 weight percent, based on the total weight of the coating composition.

The akylacrylate having a $T_g$ less than about $-45°$ C. is present in an amount of about 5 to about 30, preferably about 10 to about 20 weight percent, based on the total weight of the coating composition.

The monoethylenic material having a high $T_g$ can be present in the coating composition in a range of about 1 to about 15, preferably about 2 to about 4 weight percent, based on the total weight of the coating composition.

The photoinitiator is present in the coating composition in a range of about 0.5 to about 6, preferably about 1 to about 4 weight percent, based on the total weight of the coating composition.

The viscosity of the coating composition, as measured at a temperature of 25° C. using a Brookfield viscometer, is about 3,000 to about 12,000 centipoise (cp), preferably about 4,000 to about 10,000 cp.

It is presently believed that the polyether groups present in the acrylate of the alkoxylated phenol function to soften the cured coating and provide adequate adhesion to the glass without reducing the water resistance. This is an unexpected result as typically ether groups introduce water sensitivity which reduces water resistance and wet adhesion.

The coating composition can further include conventional adhesion promoters, stabilizers and inhibitors.

Silane coupling agents are conventional adhesion promoters and typically can be present in an amount of about 1 weight percent. Illustrative silane coupling agents include gamma methacryloxypropyl trimethoxy silane, commercially available from Hüls, Bristol, PA, under the trade designation MEMO and gamma mercaptopropyl trimethoxy silane which is commercially available from Union Carbide under the designation A-189. Conventional stabilizers such as hindered amines which provide ultraviolet stability for the cured composition can be present in amounts less than about 1 weight percent. Illustrative stabilizers include bis(2,2,6,6-tetramethyl-4-piperidinyl) sebacate which is commercially available from Ciba-Geigy Corp., Ardsley, NY, under the trade designation Tinuvin 770 and thiodiethylene (3,5-di-tert-butyl-4-hydroxy) hydrocinnamate, also commercially available from Ciba-Geigy Corp under the trade designation IRGANOX 1035. Free radical polymerization during production of the acrylated polyurethane can be inhibited by the use of an agent such as phenothiazine or butylated hydroxytoluene in an amount less than about 0.1 weight percent.

The present compositions can be applied to glass fibers utilizing conventional processes.

The following examples are presented by way of illustration and not limitation.

EXAMPLE 1

Comparison of Two Coating Compositions

The acrylate-terminated polyurethane was prepared by admixing 2-hydroxyethyl acrylate, isophorone diisocyanate, dibutyl tin dilaurate, octyl/decyl acrylate, and phenothiazine in the amounts disclosed at TABLE I, below, in a suitable vessel. Agitation and a dry air sparge were provided and maintained during the reaction. The temperature of the admixture was elevated to about 40° C. and maintained at that temperature for about 2 hours. Thereafter, the polycarbonate diol was introduced into the vessel and mixed with the admixture. The temperature of the mixture was elevated to about 70° C. and maintained at that temperature for a time period sufficient to consume substantially all of the free NCO.

TABLE I

ACRYLATE-TERMINATED POLYCARBONATE DIOL-BASED POLYURETHANE

| Component | Parts (by weight) |
|---|---|
| Polycarbonate diol[1] | 55.50 |
| 2-hydroxyethyl acrylate | 5.46 |
| Isophorone diisocyanate | 19.01 |
| Octyl/decyl acrylate[2] | 19.94 |
| Dibutyltin dilaurate | .06 |
| Phenothiazine | .03 |

[1]Permanol KM 10-1733, commercially avaliable from Permuthane Coatings, Peabody, MA.
[2]ODA, Commmercially available from Radcure Specialties Inc., Louisville, KY.

Aliquots of the above described acrylated polyurethane were admixed with various proportions of the other components utilized in the coating composition to produce the present coating compositions A and B. The proportion of these other components and of the acrylated polyurethane are presented in TABLE II.

TABLE II

COATING COMPOSITIONS

| | (Parts by weight) | |
|---|---|---|
| Component | A | B |
| Acrylated polyurethane[1] | 57.0 | 62.0 |
| Acrylate of an alkoxylated phenol[2] | 33.0 | — |
| Phenoxyethyl acrylate | — | 32.9 |
| N-vinyl pyrrolidone | 4.0 | — |
| Irgacure 184[3] | 4.0 | 2.0 |
| Lucirin TPO[4] | — | 1.0 |
| Silane[5] | 1.0 | 1.0 |
| Tinuvin 292[6] | 0.5 | 0.5 |
| Irganox 245[7] | 0.5 | — |
| Irganox 1035[8] | — | 0.5 |
| Polycat DBU[9] | — | 0.1 |

[1]The acrylated polyurethane of TABLE I was utilized.
[2]An alkoxylated nonyl phenol acrylate, commercially available from Toa Gosei, Japan under the trade designation Aronix M-113.
[3]An aryl ketone photoinitiator, commercially available from Ciba-Geigy Corp., Ardsley, NY.
[4]An acylphosphine oxide photoinitiator, commercially available from BASF Corp., Germany.
[5]An adhesion promoter, commercially available from Hüls, Bristol, PA under the trade designation Dynasylan MEMO.
[6]A stabilizer, commercially available from Ciba-Geigy Corp., Ardsley, NY.
[7]A stabilizer, commercially available from Ciba-Geigy Corp., Ardsley, NY.
[8]A stabilizer, commercially available from Ciba-Geigy Corp., Ardsley, NY.
[9]An amine catalyst, commercially available from Air Products and Chemicals, Inc., Allentown, PA.

Compositions A and B of TABLE II were prepared by admixing the components and mixing in the ingredients while heating to 60° C. for 20 minutes.

The coating compositions A and B are well adapted to provide a primary coating for optical glass fibers. This was not previously possible using the acrylated polyurethanes utilized in compositions A and B because modification of conventional acrylated polyurethane containing compositions to improve flexibility and softness resulted in a loss in water resistance, cure speed, and/or adhesion to glass.

The cure speed [Joules/square centimeter (J/sq cm)] and physical properties, i.e., modulus [megapascals (MPa)] and dry and wet adhesion (grams), are presented in TABLE III, below. The procedures for determining the cure speed and physical properties are described hereinafter.

TABLE III

CURE SPEED AND PHYSICAL PROPERTIES

| Coating Composition | Cure Speed (J/sq cm) | Modulus (MPa) | Adhesion-dry/wet (grams) |
|---|---|---|---|
| A | 0.5 | 2.0 | 60/40 |
| B | 0.4 | 2.1 | 170/70 |

The cure speed [Joules/square centimeter (J/sq cm)] indicates the number of J/sq cm required to obtain 95% of ultimate modulus of a 3 mil thick coating utilizing a "D" lamp from Fusion Curing Systems, Rockville, MD. The "D" lamp emits radiation having a wavelength of about 200 to about 470 nanometers with the peak radiation being at about 380 nanometers and the power output thereof is about 300 watts per linear inch.

The cure speeds obtained are considered rapid by industrial standards. The optical glass fiber coating industry currently utilizes primary coating composition having cure speeds of about 1.0 J/sq cm.

A film for determination of the modulus of the coating was prepared by drawing down a 3 mil coating on glass plates using a Bird bar from Pacific Scientific, Silver Spring, MD. The coating was cured using the "D" lamp. The coating was cured at a dose of about 1 J/sq cm which provided complete cure. The film was then conditioned at 23°±2° C. and 50±5% relative humidity for a minimum time period of 16 hours.

Six, 0.5 inch wide test specimens were cut from the film parallel to the direction of the draw down. Triplicate measurements of the dimensions of each specimen were taken and the average utilized. The modulus of these specimens are then determined using an Instron Model 4201 from Instron Corp., Canton, MA operated in accordance with the instructions provided therewith.

To determine the dry and wet adhesion of a film to glass, films were prepared by drawing down 3 mil coatings on glass plates using the Bird bar. The coatings were cured using the "D" lamp.

The films were then conditioned at a temperature of 23±2° C. and a relative humidity of 50±5% for a time period of 7 days. A portion of the film was utilized to test dry adhesion. Subsequent to dry adhesion testing, the remainder of the film to be tested for wet adhesion was further conditioned at a temperature of 23±2° C. and a relative humidity of 95% for a time period of 24 hours. A layer of a polyethylene wax/water slurry was applied to the surface of the further conditioned film to retain moisture.

The adhesion test was performed utilizing an apparatus including a universal testing instrument, e.g., an Instron Model 4201 commercially available from Instron Corp, Canton, MA, and a device, including a horizontal support and a pulley, positioned in the testing instrument.

After conditioning, sample specimens that appeared to be uniform and free of defects were cut in the direction of the draw down. Each specimen was 6 inches long and 1 inch wide and free of tears or nicks. The first one inch of each specimen was peeled back from the glass plate. The glass plate was secured to the horizontal support with the affixed end of the specimen adjacent to the pulley. A wire was attached to the peeled-back end of the specimen, run along the specimen and then run through the pulley in a direction perpendicular to the specimen. The free end of the wire was clamped in the upper jaw of the testing instrument which was then activated. The test was continued until the average force value becomes relatively constant.

EXAMPLE II

Preparation and Evaluation of Additional Oligomers

Oligomer 1 1596.23g Isophorone diisocyanate, 1438.64 g Isodecylacrylate, 2.25 g phenothiazine, and 4.49 g Dibutyltin dilaurate were charged to a 22 liter round bottom glass flask fitted with a stirrer, dry air sparge, thermometer, reflux condenser, a heating mantle, and an addition funnel. 477.24 g 2-hydroxyethyl acrylate were added dropwise from the addition funnel over a 1 hour period with the flask temperature rising from 30° C. to 43° C. After a 1 hour hold period, the contents were heated to 60° C. and held for 5 hours, where the level of free isocyanate was measured to be 11.85%. A premixture of 2480g of Permanol KM10-1733 and 2480g of Niax PPG 1025 (Union Carbide) were added all at once, and the contents were heated to 90° C. After 1 hour, 322.42g isodecyl acrylate were added and the contents were held at 90° C. for an additional 6 hours, when the level of free isocyanate was measured to be 0.01%.

Oligomer 2

1627.98 g isophorone diisocyanate, 1439.80 g isodecyl acrylate, 2.00 g phenothiazine, and 4.73 g dibutyltin dilaurate were charged to a 12 liter round bottom glass flask fitted wtih a stirrer, dry air sparge, reflux condenser, thermometer, addition funnel, and a heating mantle. 477.24 g 2-hydroxyethyl acrylate were added over a period of 90 minutes with the temperature rising from 28°-34° C. The flask contents were heated to 40° C., and held for 2 hours, when the level of free isocyanate was measured to be 12.1%. A premixed solution of 2466.90 g Permanol KM10-1733 and 2467.10 g PolyTHF 1000 (BASF) were added all at once. 321.50 g isodecyl acrylate were added and the contents were heated to 90° C. and held for 6 hours, when the level of free isocyanate was measured to be 0%.

Oligomer 3

145.99 g Isophorone diisocyanate, 239.71 g isodecyl acrylate, 0.25 g BHT and 0.52 g dibutyltin dilaurate were charged to a 2 liter round bottom glass flask fitted with a stirrer, thermometer, reflux condenser, dry air sparge, addition funnel, and a heating mantle on a thermostatically controlled automatic jack. 23.16 g 2-hydroxyethyl acrylate were added over a 90 minute period from the addition funnel with the temperature remaining constant at 25°-26° C. The contents were heated to 40° C. after the addition, and then held for 2 hours, when the level of free isocyanate was measured to be 10.9%. 504.91 g Permanol KM10-1733 were added all at once, the contents were heated to 80° C., and 49.47 g isodecyl acrylate were added. After sitting at 25° C. for 2.5 days, the level of free isocyanate was measured to be 0.04%.

Oligomers 1, 2 and 3 were formulated, cured and evaluated by the practices utilized in Example 1. The formulations and results of the evaluations are set forth in Table IV below.

TABLE IV

| | Coating X | Coating Y | Coating Z |
|---|---|---|---|
| Oligomer 1 | | 64 | |
| Oligomer 2 | 68 | | |
| Oligomer 3 | | | 42.68 |
| Purified Lucirin TPO | 3 | 3 | |
| Lucirin TPO | | | 2.98 |
| Irganox 1035 | | 0.5 | 0.5 |
| Tinuvin 292 | 0.5 | 0.5 | 0.5 |
| A-189* | 0.5 | 0.25 | 0.25 |
| Z-6040** | 0.5 | 0.25 | |
| Photomer 4003*** | | 31.5 | |
| Aronix M-113 | | | 52.6 |
| Tripropyleneglycol diacrylate | | | 0.5 |
| PEA | 2.7 | | |
| Iraganox 245 | 0.5 | | |
| Modulus, MPa | 2.3 | 1.7 | 1.1 |
| Cure Speed, J/cm$^2$ | 0.45 | .32 | 0.37 |
| Adhesion, gf dry/wet | 89/39 | 25/14 | 62/22 |

*6-mercaptopropyltrimethoxysilane
**y-glycidoxypropyltrimethoxysilane
***Same structure as Aronix M-113

This invention has been described in terms of specific embodiments set forth in detail, but it should be understood that these are by way of illustration only and that the invention is not necessarily limited thereto. Modifications and variations will be apparent from the disclosure and may be resorted to without departing from the spirit of the invention, as those skilled in the art will readily understand. Accordingly, such variations and modifications of the disclosed products are considered to be within the purview and scope of the invention and the following claims.

We claim:

1. A photocurable liquid coating composition adapted to provide a primary coating for an optical glass fiber comprising: (1) about 30 to about 80 weight percent, based on the total weight of the coating composition, of an acrylate-terminated polyurethane having a number average molecular weight of about 2,500 to about 8,000 daltons and being the reaction product of (i) a prepolymer having a number average molecular weight of about 700 to about 2,000 daltons wherein the prepolymer is selected from the group consisting of polycarbonates and mixtures of polycarbonates and polyethers having an average of at least two groups that are reactive with the isocyanate group, (ii) a diisocyanate and (iii) a hydroxy acrylate; (2) about 20 to about 60 weight percent of an acrylate of an unsubstituted of $C_7$–$C_{10}$ alkyl substituted phenol that is alkoxylated with a $C_2$–$C_4$ alkylene oxide and contains about 1 to about 5 moles of the oxide per mole of the phenol; and (3) about 5 to about 30 weight percent of at least one alkylacrylate having a $T_g$ below about −45° C.

2. The coating composition in accordance with claim 1 wherein the acrylate of the alkoxylated phenol is alkoxylated with ethylene oxide.

3. The coating composition in accordance with claim 1 wherein the acrylate of the alkoxylated phenol contains about 3.5 to about 4 moles of the oxide per mole of phenol.

4. The coating composition in accordance with claim 3 wherein the acrylate of the alkoxylated phenol is alkoxylated with ethylene oxide.

5. The coating composition in accordance with claim 1 wherein the acrylate of the alkoxylated phenol is substituted with a $C_8$–$C_9$ alkyl group.

6. The coating composition in accordance with claim 1 wherein the acrylate of the alkoxylated phenol is present in an amount in the range of about 20 to about 35 weight percent and the acrylated polyurethane is present in an amount in the range of about 30 to about 60 weight percent.

7. The coating composition in accordance with claim 1 wherein the prepolymer is (a) a polycarbonate diol produced from an alkylene diol having about 2 to about 12 carbon atoms or (b) a polycarbonate copolymer of a polyalkylene oxide and the alkylene diol.

8. The coating composition in accordance with claim 1 wherein the prepolymer is (a) a polycarbonate diol produced from an alkylene diol having about 4 to about 8 carbon atoms or (b) a polycarbonate copolymer of a polyalkylene oxide and the alkylene diol.

9. The coating composition in accordance with claim 1 wherein the prepolymer has a number average molecular weight of about 800 to about 2,000 daltons.

10. The coating composition in accordance with claim 1 wherein the polyurethane has a number average molecular weight of about 3,000 to about 7,000 daltons.

11. The coating composition in accordance with claim 1 further including about 1 to about 15 weight percent of a monethylenically unsaturated material having a $T_g$ greater than about 40° C. and a strong capacity for hydrogen bonding.

12. The coating composition in accordance with claim 11 wherein the monoethylenically unsaturated material is an N-vinyl monomer.

13. The coating composition in accordance with claim 1 further including about 2 to about 4 weight percent of a monoethylenically unsaturated material having a $T_g$ greater than about 40° C. and a strong capacity for hydrogen bonding.

14. The coating composition in accordance with claim 1 wherein the prepolymer has an average of at least about two groups that are reactive with the isocyanate group and the mole ratio of prepolymer:diisocyanate: hydroxy acrylate utilized to produce the acrylated polyurethane is in a range of about 1:2:2, respectively, to about 5:6:2, respectively.

15. A photocurable liquid coating composition adapted to provide a primary coating for an optical glass fiber comprising: (1) about 30 to about 60 weight percent, based on the total weight of the coating composition, of an acrylate-terminated polyurethane having a number average molecular weight of about 2,500 to about 8,000 daltons and being the reaction product of (i) a prepolymer having a number average molecular weight of about 700 to about 2,000 daltons, the prepolymer being (a) a polycarbonate diol produced from an alkylene diol having about 2 to about 12 carbon atoms or (b) a polycarbonate copolymer of an alkylene oxide and the alkylene oxide diol, (ii) a diisocyanate and (iii) a hydroxy acrylate; (2) about 20 to about 60 weight percent of an acrylate of an unsubstituted or $C_8$–$C_9$ alkyl substituted phenol that is alkoxylated with a $C_2$–$C_4$ alkylene oxide and contains about 1 to about 10 moles of the oxide per mole of the phenol; and (3) about 5 to about 30 weight percent of at least one alkylacrylate having a $T_g$ below about −45° C.

16. The coating composition in accordance with claim 15 wherein the alkylene diol of (i) has about 4 to about 8 carbon atoms.

17. The coating composition in accordance with claim 15 wherein the acrylate of the alkoxylated phenol is alkoxylated with ethylene oxide.

18. The coating composition in accordance with claim 15 wherein the acrylate of the alkoxylated phenol contains about 3.5 to about 4 moles of the oxide per mole of phenol.

19. The coating composition in accordance with claim 15 wherein the acrylate of the alkoxylated phenol is alkoxylated with ethylene oxide.

20. The coating composition in accordance with claim 15 wherein the acrylate of the alkoxylated phenol is present in an amount in the range of about 10 to about 35 weight percent.

21. The coating composition in accordance with claim 15 further including about 1 to about 15 weight percent of a monoethylenically unsaturated material having a $T_g$ greater than about 40° C. and a strong capacity for hydrogen bonding.

22. The coating composition in accordance with claim 15 wherein the mole ratio of polycarbonate diol:- diisocyanate: hydroxy acrylate utilized to produce the polyurethane is in a range of about 1:2:2, respectively, to about 5:6:2, respectively.

* * * * *

UNITED STATES PATENT AND TRADEMARK OFFICE
CERTIFICATE OF CORRECTION

PATENT NO. : 5,219,896
DATED : June 15, 1993
INVENTOR(S) : Coady et al.

It is certified that error appears in the above-identified patent and that said Letters Patent is hereby corrected as shown below:

Column 2, Line 5    Delete "$C_1$" and insert --$C_{10}$--.

Column 3, Line 14   After "acrylate", insert a comma.

Column 3, Line 17   After "temperature", insert --"--.

Column 5, Line 17   Delete "o" and insert --of--.

Signed and Sealed this

First Day of March, 1994

Attest:

BRUCE LEHMAN

*Attesting Officer*      *Commissioner of Patents and Trademarks*